US008737581B1

(12) United States Patent
Halferty et al.

(10) Patent No.: US 8,737,581 B1
(45) Date of Patent: *May 27, 2014

(54) PAUSING A LIVE TELECONFERENCE CALL

(71) Applicant: Sprint Communications Company L.P., Overland Park, KS (US)

(72) Inventors: Clark Douglas Halferty, Lees Summit, MO (US); Caleb Sission Hyde, Kansas City, MO (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/768,103

(22) Filed: Feb. 15, 2013

Related U.S. Application Data

(63) Continuation of application No. 12/861,408, filed on Aug. 23, 2010, now Pat. No. 8,406,390.

(51) Int. Cl.
*H04M 1/64* (2006.01)
*H04M 3/42* (2006.01)
*H04M 1/725* (2006.01)

(52) U.S. Cl.
USPC .................. 379/88.23; 379/202.01; 455/412.1

(58) Field of Classification Search
USPC ............ 379/67.1, 202.01, 207.01; 455/412.1, 455/416, 450
See application file for complete search history.

(56) References Cited

U.S. PATENT DOCUMENTS

| 5,797,123 | A  | 8/1998  | Chou et al. |
| 5,946,658 | A  | 8/1999  | Miyazawa et al. |
| 6,070,139 | A  | 5/2000  | Miyazawa et al. |
| 8,037,070 | B2 | 10/2011 | Maghoul |
| 2002/0087315 | A1 | 7/2002 | Lee et al. |
| 2004/0135821 | A1 | 7/2004 | Mazzeo |
| 2005/0033582 | A1 | 2/2005 | Gadd et al. |
| 2005/0283475 | A1 | 12/2005 | Beranek et al. |
| 2007/0011008 | A1 | 1/2007 | Scarano et al. |
| 2008/0114837 | A1 | 5/2008 | Biggs et al. |
| 2008/0198978 | A1 | 8/2008 | Olligschlaeger |
| 2008/0201143 | A1 | 8/2008 | Olligschlaeger et al. |
| 2008/0294439 | A1 | 11/2008 | Kirby |
| 2009/0292526 | A1 | 11/2009 | Harari et al. |
| 2009/0327263 | A1 | 12/2009 | Maghoul |

OTHER PUBLICATIONS

Final Office Action mailed Apr. 29, 2013 in U.S. Appl. No. 12/687,548; 28 pages.
Non-Final Office Action mailed Nov. 30, 2012 in U.S. Appl. No. 12/687,548; 12 pages.
Non-Final Office Action mailed Nov. 30, 2012 in U.S. Appl. No. 12/687,548, 16 pages.

*Primary Examiner* — Mohammad Islam

(57) ABSTRACT

Methods and products are described for facilitating a method of controlling participation in a teleconference call. One embodiment of the method includes connection to a teleconference call so that a user of a communications device is capable of participating in the call. Any real-time inbound audio and real-time outbound audio is recorded and stored. At some point during the call, a pause command is received that indicates a desire to suspend real-time participation in the teleconference call and that starts a pause process. One embodiment of the pause process includes continuing to record the real-time inbound audio but preventing it from being presented via the communications device until a resume request is received, preventing the real-time outbound audio from being sent to other call participants until a resume request is received, and enabling a resume option that allows the user to re-engage in real-time participation in the teleconference call.

20 Claims, 6 Drawing Sheets

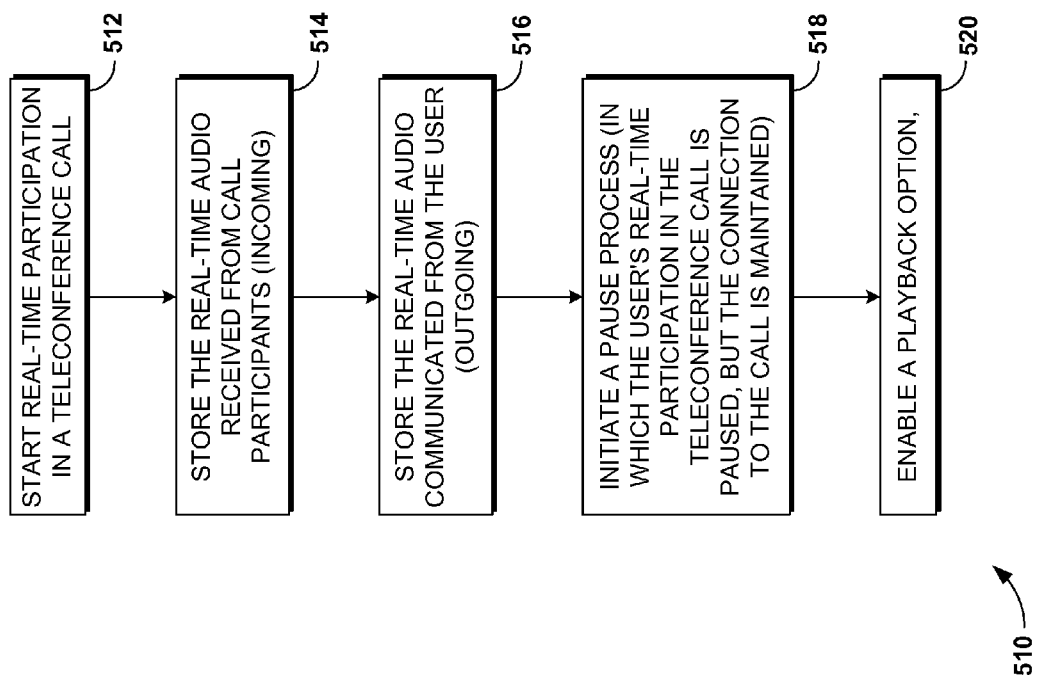

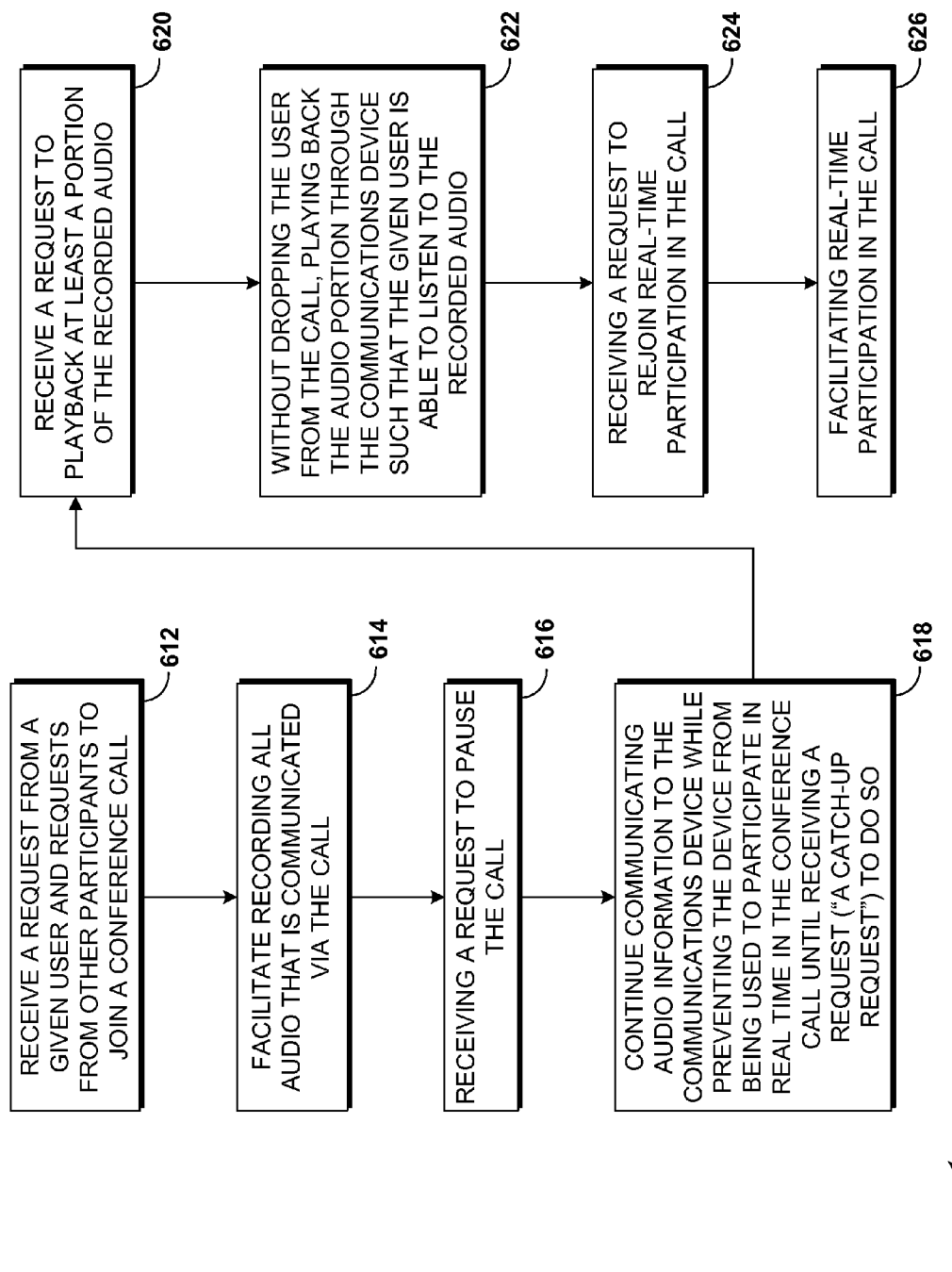

PAUSING A LIVE TELECONFERENCE CALL

CROSS-REFERENCE TO RELATED APPLICATIONS

This application is a continuation of and claims the benefit of U.S. application Ser. No. 12/861,408, filed Aug. 23, 2010, entitled "Pausing a Live Teleconference Call," which is entirely incorporated herein by reference.

SUMMARY

A high-level overview of various aspects of our technology is provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways of controlling a person's real-time participation in a teleconference call, including an ability to pause the call, review a conversation that had taken place while the call is paused, maintaining a connection to the call, and enabling a user to re-engage in real-time participation at will.

BRIEF DESCRIPTION OF THE SEVERAL VIEWS OF THE DRAWINGS

Illustrative embodiments of our technology are described in detail below with reference to the attached drawing figures, wherein:

FIGS. 4-6 depict three illustrative methods of facilitating control over real-time participation in a teleconference call.

DETAILED DESCRIPTION

The subject matter of the present technology is described with specificity herein to meet statutory requirements. However, the description itself is not intended to define the technology, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present technology. The following is a list of these acronyms:

| | |
|---|---|
| ASCII | American Standard Code for Information Interchange |
| CDMA | Code Division Multiple Access |
| GIS | Geographic/Geographical/Geospatial Information System |
| GPRS | General Packet Radio Service |
| GSM | Global System for Mobile communications: originally from Groupe Spécial Mobile |
| IP | Internet Protocol |
| LTE | Long Term Evolution |
| PSTN | Public Switched Telephone Network |
| SMS | Short Message Service |
| TDMA | Time Division Multiple Access |
| UMTS | Universal Mobile Telecommunications System |

Further, various technical terms are used throughout this description. An illustrative resource that fleshes out various aspects of these terms can be found in Newton's Telecom Dictionary, 25th Edition (2009).

Embodiments of our technology may take the form of, among other things: a method, system, or set of instructions embodied on one or more computer-readable media. Computer-readable media includes both volatile and nonvolatile media, removable and nonremovable media, and contemplates media readable by a computing device. Computer-readable media includes any that is useable for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
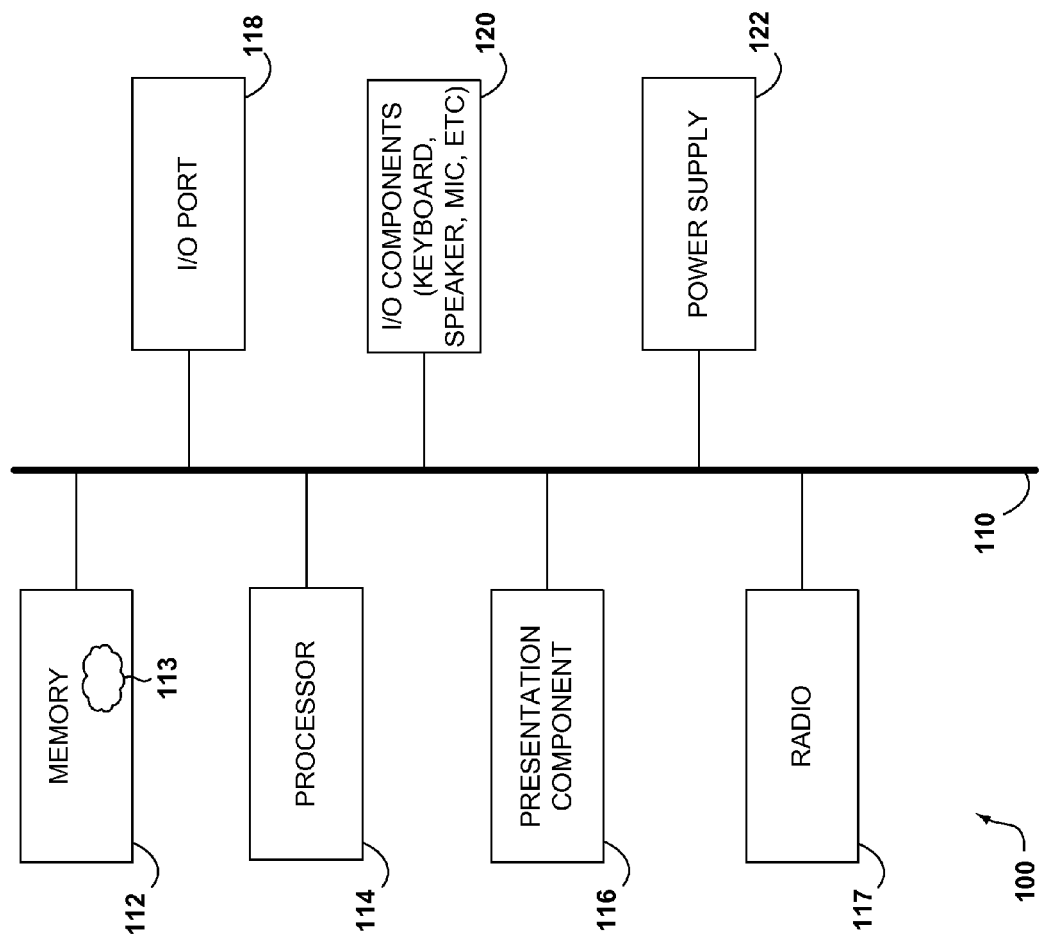
FIG. 1 depicts an exemplary calling device (variously referred to as a "mobile calling device" or sometimes just "phone") according to one embodiment of our technology.

Turning now to FIG. 1, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Radio 117, if included, represents a radio that facilitates communication with a wireless telecommunications network. Illustrative wireless telecommunications technologies include CDMA, GPRS, TDMA, GSM, and the like (including what is known in the art as WiMax technology and also Long Term Evolution (LTE). In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, an embodiment of our technology facilitates a method of controlling participation in a teleconference call. Particularly, our technology enables a user to pause a live telephone call and also to fast-forward playback, rewind, and the like. By way of example, consider a situation in which a given user phones into a teleconference call that is composed of multiple other participants. During the course of a call, a situation arises in which the user would desire to temporarily postpone real-time interaction with the other participants while maintaining an ability to re-engage such participants at will. In this way, the user desires to pause the live telephone call.

In accordance with one embodiment of our technology, the user would indicate his/her desire to pause the telephone call, which would invoke a pause process that includes preventing any audio associated with the user from being conveyed to the participants but also records any audio information that is being conveyed by the participants. During this pause process, the user is free to listen to any previously recorded audio, fast-forward the audio, rewind the audio, etc. In some embodiments, a real-time transcription of the audio that is being communicated by the other participants is presented to the user, thereby enabling him/her to review any conversation that he/she missed during the pause process.

According to some embodiments of our technology, the system includes intelligent features. One illustrative intelligent feature includes an ability to monitor the audio information of the other participants for one or more key words. For example, a user might indicate a list of key words to be monitored for, such as his/her name, whether there are any questions, calls for meeting to end, etc. When one of the other participants mentions one of these key words, the system can indicate the same to a user and wait for another command or automatically carry out an action, such as jumping the user to live, and thereby enabling instant real-time participation with the other participants.

Figure 2:
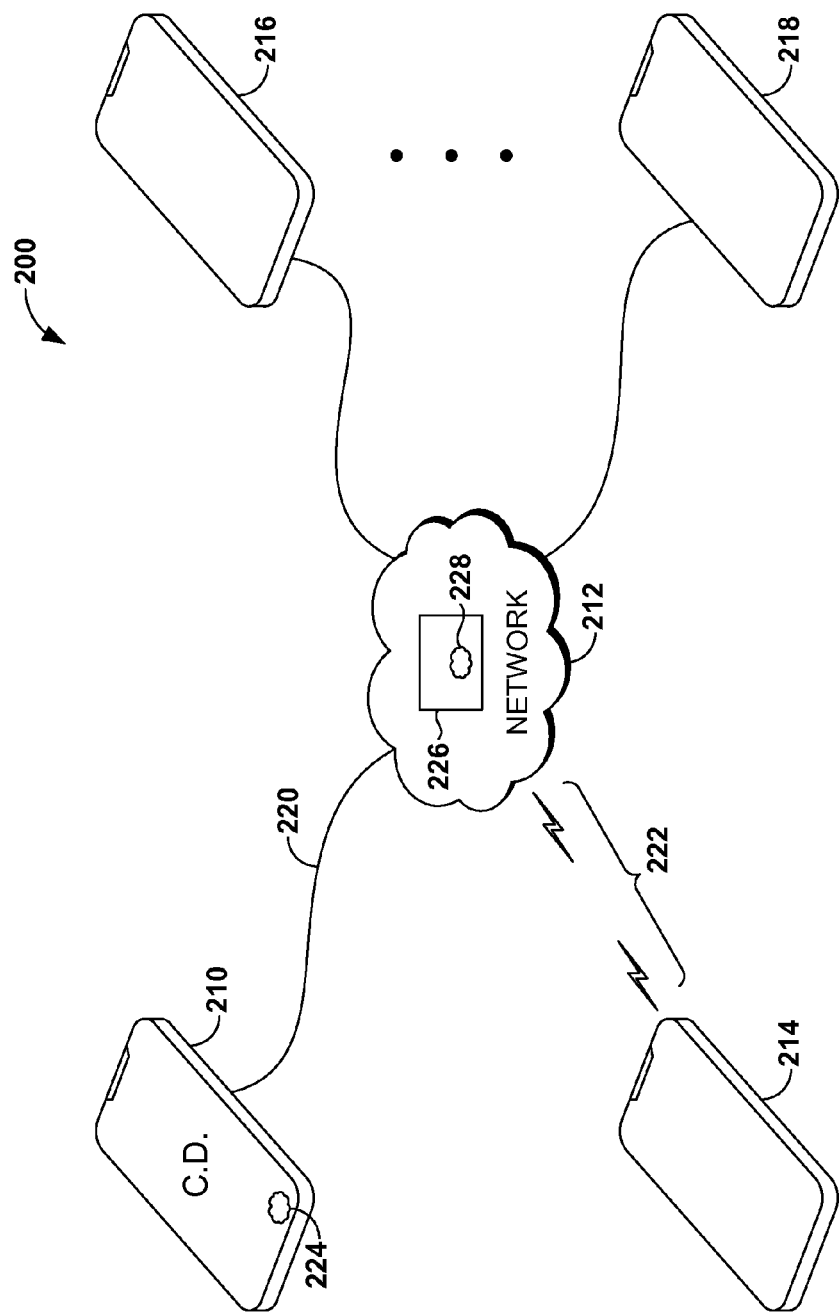
FIG. 2 depicts an illustrative operating environment suitable for practicing an embodiment of our technology.

Turning now to FIG. 2, an illustrative operating environment suitable for practicing an embodiment of our technology is provided and referenced generally by the numeral 200. Operating environment 200 can include two or more communications devices that are coupled to each other to facilitate a teleconference call. By way of example, four communications devices are shown (210, 214, 216, and 218). As illustratively shown, communications device 210 includes a set of computer-executable instructions that are embodied on one or more computer-readable media of the computing device, which will be referred to herein as application 224. In one embodiment, application 224 carries out various functional aspects of the invention.

Each communications device is coupled to a network 212, which can actually be multiple networks such as one or more of the Internet, the PSTN, and other public or private networks. Network 212 is shown to symbolically represent a communications network(s) that enables a teleconference call to take place between the communications devices. As illustratively shown, the communications link 220 can be wire-line or wireless, as indicated by reference numeral 222.

One embodiment of our technology contemplates server side interaction by way of a server 226, which includes an application 228, which, in one embodiment, carries out functional aspects as described herein and can be done alone or in combination with application 224 as desired.

Figure 3:
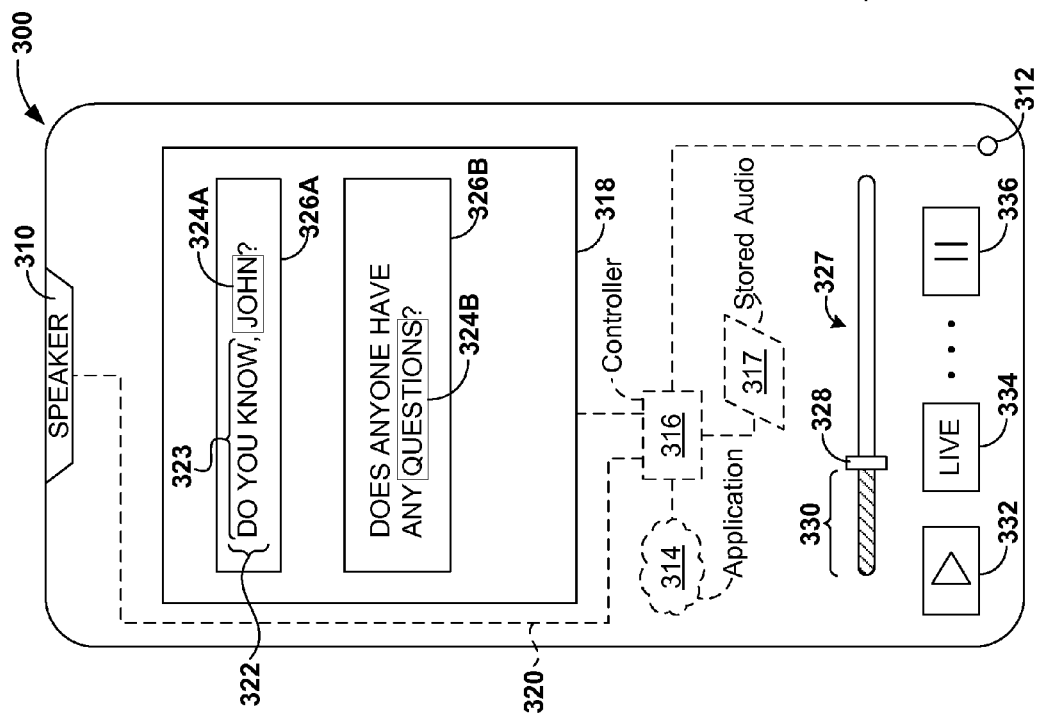
FIG. 3 depicts an illustrative communications device and user interface components in accordance with an embodiment of our technology.

Turning now to FIG. 3, greater detail of aspects of a computing device is provided and referenced generally by the numeral 300. As illustratively shown, communications device 300 includes a speaker 310 and a microphone 312. Speaker 310 is usable to audibly present audio information that is received by communications device 300. Similarly, microphone 312 is usable to receive audio information and pass it through to a network such as network 212 such that other participants can hear what was said by a given user. Similar to application 224 of FIG. 2, application 314 is a set of embodied computer executable instructions that cooperate to carry out various functional aspects of the invention. In one embodiment, it is coupled to a controller 316 that processes information, and in one embodiment can be a processor of communications device 300. It is illustratively shown to be communicatively coupled to application 314 as well as microphone 312, a display 318, and can also access stored audio 317 when it becomes available.

Controller 316 is also illustratively shown by link 320 to be coupled to speaker 310. This does not mean that controller 316 needs to be connected to the speaker 310 per se; rather, it indicates that controller 316 has access to the same audio information that is often presented by way of speaker 310. As used herein, the term "audio information" is not necessarily distinct from "audio" per se. But in some embodiments it might include additional information such as touch tones of dialed digits, metadata, etc. As the participants participate in the teleconference call, the audio information generated by them is conveyed to communications device 300, and is accessible by controller 316.

Display 318 is usable to present textual information in embodiments that include a communications device that have such a display. Such textual information might include a transcription 322 of a piece of audio. It might include context 323 data that helps understand the context of a key word 324a, 324b that was stated. For example, one of the participants might ask "Do you know, John?" in a way that is asking whether John knows an answer to a given question. As will be explained, John 324a might be a key word that triggers mobile device 300 to jump to live and rejoin the conference call. Including context information 323 to form a sentence 322 enables a user to get a sense of the context for the key word 324a. In some embodiments, the invention does not jump immediately to live but presents an actionable control that, if acted on, would jump a user to live. For example, perhaps a box 326A is painted around the symbol such that if the box, acting as a button, is pressed then a user is placed into live participation in the teleconference call.

Other visual controls are also shown as being displayed, such as a progress bar 327, which includes an indicator 328 that indicates a level of progression of the conference call, and a portion 330 that indicates an amount of stored audio information. Other displayed controls (or optionally in the form of physical buttons) include a play button 332, a jump-to-live button 334, other buttons, as well as a pause button 336 that is usable to convey a desire to pause the teleconference call.

As will be described in greater detail below, communications device 300 is usable to join a teleconference call and also to pause, or temporarily postpone real-time participation in, the teleconference call. In one embodiment, communications device 300 works substantially independently to carry out aspects of the invention. In other embodiments, a server-side approach is utilized such that server-side components carry out some of the functions that will be described below as being carried out by communications device 300. In still other embodiments, communications device 300 works in more equal concert with a remote device (e.g., 226) to effect the invention.

Figure 4:
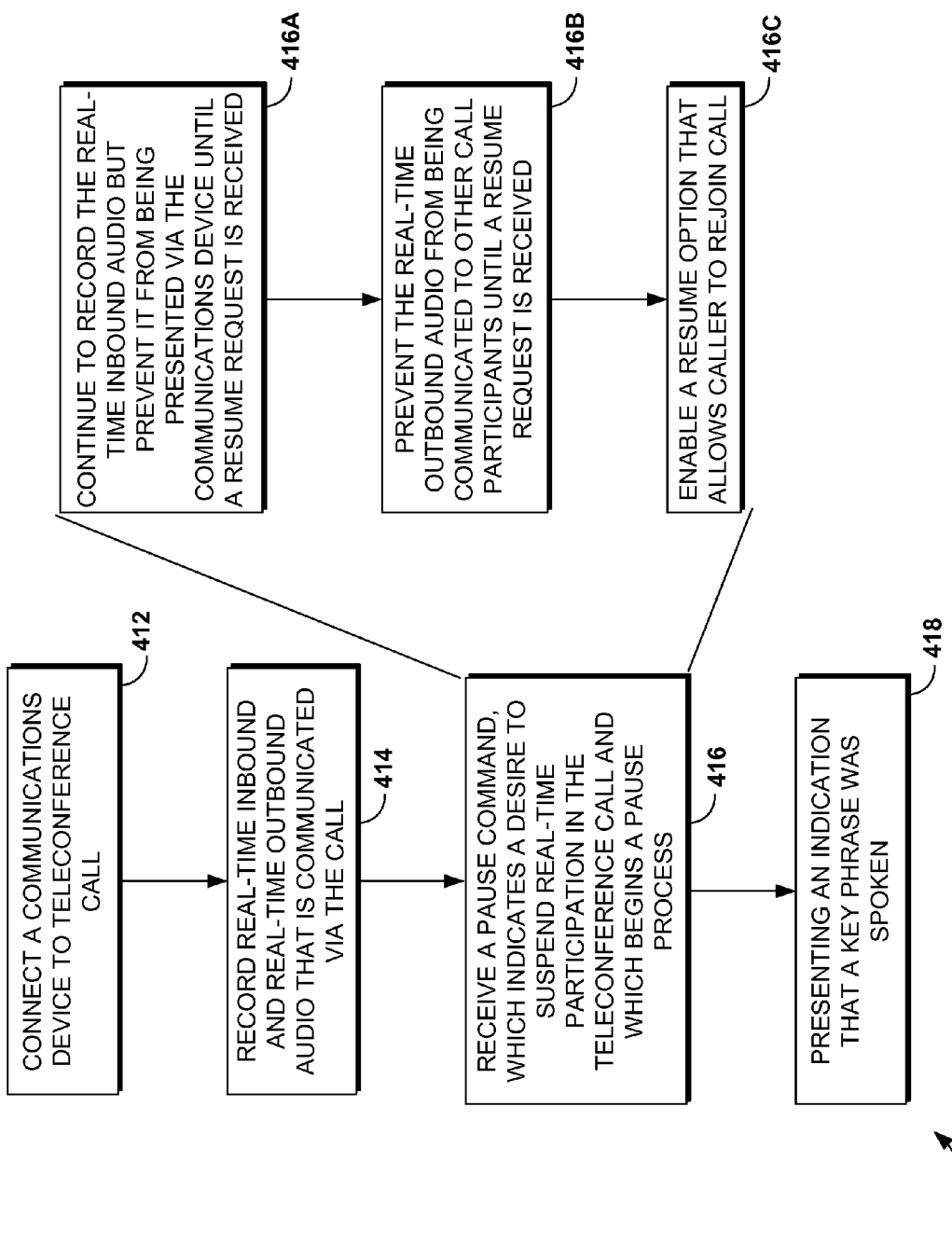

Turning now to FIG. 4, an illustrative method for controlling real-time participation in a teleconference call is provided and referenced generally by numeral 410. It will also reference FIGS. 3 and 2 in connection with the steps of FIG. 4 to help explain an embodiment of our technology. At a step 412, a communications device is utilized to connect to a teleconference call. In one embodiment, a device such as communications device 300 is used to connect to a teleconference call. A user of device 300 can use device 300 to phone into the teleconference call. In other embodiments, an outside caller might call device 300 so that it is used to join the teleconference call.

At a step 414, the real-time inbound audio and real-time outbound audio that is communicated via the call is recorded. In one embodiment, this recording happens automatically. In another embodiment, a user can select an option to engage recording. The real-time inbound audio is audio that is spoken by other participants and communicated to the other participants; that is, to communications device 300. Similarly, the real-time outbound audio is that which is communicated from and through communications device 300. If a single user is using device 300, then his/her voice is communicated as real-time outbound audio. If communications device 300 is operating via speakerphone for example to host multiple users, then whatever audio is being communicated locally from and through device 300 is considered real-time outbound audio. In brief, whatever shared audio is communicated by way of the participants is recorded in one embodiment of our technology.

Another form of stored audio includes setup information that is received from a user. For example, when a user is initially prompted to say his/her name prior to joining a conference, that information can be recorded and stored (either locally or remotely). The system can then use this recording to carry out other aspects of the invention, such as monitoring for the person's key word. For example, if a user by the name of John calls into a teleconference call, is prompted to speak his name, utters "John," then the system can receive this information and either use an audio footprint or textural transcription that enables the system to monitor for an occurrence of the word during the course of the teleconference call.

In one embodiment, stored audio 317 is locally stored on communications device 300. In other embodiments, the stored audio is stored on a remote device such as device 226.

At a step 416, a pause command is received, which indicates a desire to suspend real-time participation in a teleconference call and which begins a pause process. As previously mentioned, an embodiment of our technology allows a user to pause a live teleconference call. When the pause process is instantiated, such as by selecting button 336, then recording the current conversation continues but the user by way of device 300 is no longer engaged in real-time participation. For example, at a step 416a, communications device 300 continues to record the real-time inbound audio but prevents it from being presented via the speaker 310 of communications device 300 until a resume request is received. In this way, real-time outbound audio is prevented from being communicated to the other call participants at a step 416b. The pause process includes an ability to resume the call at will.

Thus, at a step 416C, application 314 enables a resume option that allows the user of device 300 to rejoin the call. This can be activated by receiving the resume request, which, when received re-enables communication of real-time inbound and real-time outbound audio.

An exemplary use case could include a situation where a user of device 300 is engaged in a teleconference call but receives a high-priority call on a different device (such as a mobile phone, a different mobile phone, an office phone, etc.). The user does not want to end the teleconference call and also does not want to miss out on any of the conversation that will transpire while tending to the urgent matter. Thus, the user would engage the pause process (for example, by selecting button 336). Now, the user can deal with the urgent matter, which might include speaking near a proximity of microphone 312.

In one embodiment, such local audio that does not relate to the teleconference call is not recorded and stored as part of stored audio 317. After the user deals with the urgent matter, he or she might wish to review a conversation that has transpired since the call was placed on hold. In one embodiment, the audio from the teleconference call was prevented from being outputted via speaker 310. One way of reviewing the prior conversation is to listen to the recorded audio, which can be accomplished by way of selecting button 332 for example. In another embodiment, application 314 facilitated transcribing the conversation, and making it presentable by way of a portion 318 of the display of device 300. This would allow a user to quickly read as much as desired about the conversation that took place while the call was placed on hold. In still another embodiment, a user can select an option (not shown) to email a transcript or otherwise have the transcription sent to another device, such as a PC with a large monitor, so that viewing the transcription can be done even easier.

Although the user can re-engage in live participation in the teleconference call at will, application 314 can be set up so as to cause real-time participation to be automatically re-engaged in if a certain keyword is spoken. For example, either offline or in immediate advance of the call, a user can indicate a desired key phrase or set of key phrases that, if uttered, would result in communications device 300 acting in response to the utterance. One way of responding to the utterance is to immediately place the user of communications device 300 into real-time participation in the call. Another way of responding to such utterance might be to present a visual indication associated with the utterance.

As briefly alluded to above, the user might indicate a phrase such as "does anyone" as a key phrase. He or she might be concerned about not participating in a question that is posed to the group. If any participant utters the phrase "does anyone," then application 314 could automatically place the user of device 300 back into real-time participation in the teleconference call. Two examples of transcriptions that show context are provided in FIG. 3 and referenced by the numerals 326A and 326B. Sample key phrases shown include "John" 324A and "Questions" 324B. In another embodiment, the user is jumped to a few seconds before real time, and those prior few seconds are played at an accelerated rate so that the user is able to understand at least some of the context in which the key phrase was uttered.

This type of presenting an indication that a key phrase was spoken is illustrated by reference numeral 418. In one embodiment, the indication is a visual indication. In another embodiment, the indication is an audible indication, and in still another embodiment, the indication is a feel indication such as a vibration action. Thus, the indications can be slight, along the lines of a blinking LED or lamp. Or the indication can be more aggressive such as causing the phone to vibrate or presenting a message on a display of device 300 or even presenting an audible tone, which can be system or user defined.

Turning now to FIG. 5, another method of controlling participation of a user in a teleconference call is provided, and referenced generally by the numeral 510. At a step 512, real-time participation is started in a teleconference call. A device such as communications device 300 is used to present real-time audio that is received from other participants and to communicate any real-time audio that is locally received from a user of communications device 300.

At a step 514, the real-time audio that is received from the call participants is stored. At a step 516, the outgoing audio from a user of device 300 is stored as well, collectively which make up stored audio 317 in one embodiment.

At a step 518, device 300 initiates a pause process in which the user's real-time participation in the teleconference call is paused but the connection to the call is maintained. The connection to the teleconference call is not severed when the pause process begins. Moreover, our invention is different than merely placing everyone on hold. Merely placing someone on hold does not afford an opportunity for the user to retrieve the audio information that was presented during the whole process and before the call was terminated. But our technology does allow for this. Hence, a playback option is enabled at a step 520. If a user acts on the playback option, then the stored audio is played back by way of communications device 300. A control such as slider 327 can be presented during playback of stored audio in one embodiment. The user is free to manipulate slider control 328 to navigate to any desired portion of the teleconference call. Moreover, because the audio continued to be recorded even while the call was paused, the user is enabled with an ability to listen to that portion of the conversation that was missed in addition to that portion of the conversation that has already occurred.

Turning now to FIG. 6, another embodiment of controlling participation in a teleconference call is provided and referenced generally by the numeral 610. This embodiment utilizes more server-side aspects than a more client-based solution. In this embodiment, a request is received from a given user as well as other participants to join a conference call at a step 612. In one embodiment, these requests can be serviced by server 226 and carried out by embodied instructions 228.

At a step 614, recording of all audio that is communicated via the call is facilitated. This can be accomplished by storing all of the audio at server 226 (or another storage device coupled to server 226). At a step 616, a request is received to pause the call. In one embodiment, this request is received from a communications device that is associated with a user. Thus, communications device such as communications device 210 communicates a signal to server 226 that a user of device 210 is going to enter into a paused state.

During this paused state, teleconference server 226 at step 618 continues to communicate audio information to the communications devices (including communications device 210) while preventing communications device 210 from being used to participate in real time in the conference call until a request to do so is received. During this time, any local audio that would have been communicated by way of communications device 210 is not communicated to the other participants 214, 216, and 218.

At some later point, a request is received to play back at least a portion of the recorded audio at a step 620 if desired. A user might not have any desire to review all of the audio. In such a case, the user can jump back to live to rejoin the call and then review the missed portion later, or contemporaneously by way of a written transcript. If the user does desire to review the missed portion, then server 226 receives a request to play back at least a portion of the recorded audio at a step 620. That portion is played back without dropping the user from the line at a step 622. In this way, a user of communications device 210 is able to hear what transpired in his or her absence (or at least a lack of real-time participation) and still have an ability to rejoin the call live.

At a step 624, server 226 receives a request to rejoin real-time participation in the call, which is facilitated at a step 626. Other technical aspects that were described in connection with the aforementioned local embodiment could be carried out by way of the server-centric embodiment as well. In the server-based environment, the audio is streamed in real time to communications device 210. In cases where communications device 210 is a mobile device, separate radios can be used. For example, the audio stream might be maintained by way of a voice connection, while the stored audio is communicated by way of a Wi-Fi connection or a 4G-radio connection for example.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more nontransitory computer-readable media having computer-executable instructions embodied thereon that, when executed by a communications device, facilitate a method of controlling participation in a teleconference call, the method comprising:
   connecting to the teleconference call such that a user of the communications device is capable of participating in the teleconference call;
   recording any real-time inbound and real-time outbound audio that is communicated via the call, thereby resulting in stored audio,
   A) wherein the real-time inbound audio is audio that is being spoken by other call participants, and
   B) wherein the real-time outbound audio is local audio that is being communicated from the communications device to the other call participants;
   receiving a pause command, which indicates a desire to suspend real-time participation in the teleconference call and which begins a pause process, which includes the following,
   A) continuing to record the real-time inbound audio but preventing it from being presented via the communications device until a resume request is received,
   B) preventing the real-time outbound audio from being communicated to the other call participants until a resume request is received,
   C) enabling a resume option, which is activated by receiving the resume request, which, when received, re-enables communication of the real-time inbound and real-time outbound audio,
   D) monitoring the real-time inbound audio even though it is no longer being substantially presented via speaker, wherein monitoring comprises determining that a key phrase has been spoken by one or more of the other participants, and E) presenting an indication that the key phrase was spoken, the indication comprising a feel indication.

2. The media of claim 1, wherein preventing the real-time inbound audio from being presented via the communications device includes substantially preventing it from being outputted via a speaker of the communications device.

3. The media of claim 1, wherein preventing the real-time outbound audio from being communicated to the other call participants is accomplished by muting a microphone of the communications device.

4. The media of claim 1, wherein the pause process further includes outputting onto a display of the communications device a text translation of the real-time inbound audio, thereby enabling a user to read comments from the other participants even after the pause command is received.

5. The media of claim 1, wherein presenting the indicating includes presenting one or more of:
a visual indication; and
an audible indication.

6. The media of claim 5, wherein the visual indication includes a transcription of a usage of the key phrase.

7. The media of claim 6, wherein the transcription includes surrounding context associated with the key phrase.

8. The media of claim 1, wherein the pause process further includes enabling a playback process, which includes playing back the stored audio at a playback speed.

9. The media of claim 8, wherein the playback speed is one or more of:
slower than a recorded rate;
equal to the recorded rate; or
faster than the recorded rate.

10. One or more nontransitory computer-readable media having computer-executable instructions embodied thereon that, when executed on a communications device, facilitate a method of controlling participation of a user in a teleconference call, the method comprising:
facilitating real-time participation in the teleconference call, which includes presenting real-time audio received from the other participants and communicating any real-time audio from the user;
storing the real-time audio received from the participants, thereby providing stored received audio;
storing the real-time audio communicated from the user, thereby providing stored sent audio;
initiating a pause process in which the user's real-time participation in the teleconference call is paused, but the connection to the call is maintained, wherein the pause process includes monitoring the real-time audio received from the participants for a key phrase; and
initiating a notification process that the key phrase was spoken, the notification process comprising presenting a visual indication that the key phrase was spoken, the visual indication comprising a transcription of surrounding context associated with the key phrase.

11. The media of claim 10, further comprising enabling a playback option, which, when engaged triggers a playback process that plays back one or more of the stored received audio or the stored sent audio.

12. The media of claim 11, wherein facilitating the real-time participation in the teleconference call is carried out incident to receiving input from a user to establish a connection to the teleconference call, which includes other participants.

13. The media of claim 11, further comprising presenting a playback control on a display of the communications device.

14. The media of claim 10, wherein the pause process is initiated without providing an indication to the other participants that the pause process was initiated.

15. One or more nontransitory computer-readable media having computer-executable instructions embodied thereon that, when executed by a processing device, facilitate a method of controlling participation in a teleconference call, the method comprising:
receiving a request from a given user and requests from other participants to join a conference call ("call");
facilitating recording all audio that is communicated via the call, thereby producing recorded audio;
from a communications device that is associated with the user, receiving a request to initiate a pause process to pause the call, wherein the pause process includes monitoring the real-time audio received from the participants for a key phrase;
continuing to communicate audio information to the communications device while preventing the device from being used to participate in real time in the conference call;
receiving a request to playback at least a portion of the recorded audio;
during the call, playing back the audio portion through the communications device such that the given user is able to listen to the recorded audio without severing a connection with the call;
determining a key phrase has been spoken based on the monitoring of the received real-time audio; and
presenting an indication that a key phrase has been spoken, the indication comprising an actionable control that allows the user to jump to the live call.

16. The media of claim 15, wherein presenting the indicating includes presenting one or more of:
a visual indication; and
an audible indication.

17. The media of claim 16, wherein the visual indication includes a transcription of a usage of the key phrase.

18. The media of claim 15, wherein the transcription includes surrounding context associated with the key phrase.

19. The media of claim 15, wherein the pause process further includes enabling a playback process, which includes playing back the stored audio at a playback speed.

20. The media of claim 19, wherein the playback speed is one or more of:
slower than a recorded rate;
equal to the recorded rate; or
faster than the recorded rate.

* * * * *